(12) United States Patent
Chang et al.

(10) Patent No.: US 8,016,429 B2
(45) Date of Patent: Sep. 13, 2011

(54) OPTICAL PROJECTION SYSTEM AND SMOOTH PICTURE DEVICE THEREOF

(75) Inventors: Sean Chang, Taoyuan Hsien (TW); Hung-Kuang Yang, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 1303 days.

(21) Appl. No.: 11/640,207

(22) Filed: Dec. 18, 2006

(65) Prior Publication Data

US 2007/0273955 A1    Nov. 29, 2007

(30) Foreign Application Priority Data

May 26, 2006    (TW) ................. 95118729 A

(51) Int. Cl.
*G02B 26/00*    (2006.01)
(52) U.S. Cl. .... 353/46; 353/101; 359/197.1; 359/224.2; 348/771

(58) Field of Classification Search ............... 353/46, 353/100, 101, 119; 348/742, 743, 771; 359/196.1, 359/197.1, 204.1, 212.1, 213.1, 214.1, 223.1, 359/224.1, 224.2, 290, 291, 292
See application file for complete search history.

(56) References Cited

U.S. PATENT DOCUMENTS

| 5,982,525 | A | * | 11/1999 | Matsubara et al. | 359/212.1 |
| 6,099,128 | A | * | 8/2000 | Jessl | 353/51 |
| 6,795,221 | B1 | * | 9/2004 | Urey | 359/199.1 |
| 7,524,068 | B2 | * | 4/2009 | Hayashi et al. | 353/51 |
| 7,866,831 | B2 | * | 1/2011 | Kasazumi et al. | 353/98 |
| 2006/0164710 | A1 | * | 7/2006 | Fujii et al. | 359/224 |
| 2007/0177113 | A1 | * | 8/2007 | Huibers | 353/101 |

* cited by examiner

*Primary Examiner* — William C Dowling
(74) *Attorney, Agent, or Firm* — Birch, Stewart, Kolasch & Birch, LLP

(57) ABSTRACT

A smooth picture device includes an optical element, a holder, a flexible member, a base and an actuator. The holder supports the optical element. At least one portion of the holder is coupled to the flexible member. The base supports the flexible member. The actuator is coupled to the holder and actuates the holder to vibrate.

21 Claims, 10 Drawing Sheets

OPTICAL PROJECTION SYSTEM AND SMOOTH PICTURE DEVICE THEREOF

CROSS REFERENCE TO RELATED APPLICATIONS

This Non-provisional application claims priority under 35 U.S.C. §119(a) on Patent Application No(s). 095118729 filed in Taiwan, Republic of China on May 26, 2006, the entire contents of which are hereby incorporated by reference.

BACKGROUND OF THE INVENTION

1. Field of Invention

The invention relates to an optical projection system and a smooth picture device thereof, and in particular, to an optical projection system capable of smoothing a picture and a smooth picture device thereof.

2. Related Art

Projection systems may be classified, according to projection principles, into three types including liquid crystal display (LCD) projection systems, liquid crystal on silicon (LCOS) projection systems and digital light processing (DLP) projection systems. The DLP projection system advantageously has high luminance, true tone reproducibility, and fast response time. DLP, also by virtue of its noise-free operation and miniature compactness has become the new generation in popular projection systems.

As shown in FIG. 1, a DLP projection system 1 utilizes digital control and the principle of light reflection to converge light beams coming from a light source 11, to pass the converged light beams through a tri-color filter 12, and then to focus the passed light beams onto a digital micro-mirror device (DMD) 14 through a lens assembly 13. Driving electrodes control tilt angles and deflection time periods of a plurality of micro mirrors 141 on the DMD 14 shown in FIG. 2 to switch the light beams to enter a projection lens set 15, which is a turning type lens set including a plurality of lenses and a reflector 151. The reflector 151 turns the light beams to change the light path so that the light beams are amplified by the lens 15 and then projected onto a screen 16.

As shown in FIGS. 1 and 2, each of the micro mirrors 141 of the DMD 14 corresponds to each of the pixels of the displayed picture. Selectively controlling the micro mirror 141 between two different tilt angles enables the light beams to be switched between a first state of entering the projection lens set 15 and a second state of not entering the projection lens set 15.

In order to keep the micro mirror 141 movable, a minor gap exists between two adjacent micro mirrors 141. However, after the enlarging effect of the lenses of the projection lens set 15, the gap is also amplified, thereby influencing the continuity of the picture.

In view of this, it is an important subject of the invention to provide an optical projection system capable of effectively achieving the object of smoothing the picture, and a smooth picture device thereof.

SUMMARY OF THE INVENTION

In view of the foregoing, the invention is to provide an optical projection system capable of effectively smoothing a picture and a smooth picture device thereof.

To achieve the above, the invention discloses a smooth picture device including an optical element, a holder, a flexible member, a base and an actuator. The holder supports the optical element. At least one portion of the holder is coupled to the flexible member. The base supports the flexible member. The actuator is coupled to the holder and actuates the holder to vibrate.

To achieve the above, the invention also discloses an optical projection system including a light source, an optical modulating assembly, a projection lens set and a smooth picture device. The light source emits a light. The optical modulating assembly modulates the light emitted from the light source. The projection lens set includes a lens barrel. The projection lens set receives the modulated light modulated by the optical modulating assembly and projects the modulated light onto a display screen to form a picture. The smooth picture device is disposed on a light path of the light and includes an optical element, a holder, a flexible member, a base and an actuator. The holder supports the optical element. At least one portion of the holder is coupled to the flexible member. The other portion of the holder is suspended out of the flexible member. The base supports the flexible member. The actuator is coupled to the holder and actuates the holder to vibrate.

As mentioned above, the optical projection system and the smooth picture device thereof according to the invention are to vibrate the holder by the actuator, and the holder applies a force to a connection between the supporting elements and the flexible member in a direction so that the flexible member deforms and vibrates due to the restoring force of the flexible member. Thus, the holder suspended out of the flexible member generates a natural vibrating frequency with the vibration of the flexible member. The vibration of the optical element together with the holder can break the regular light path to achieve the object of smoothing the picture effectively.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
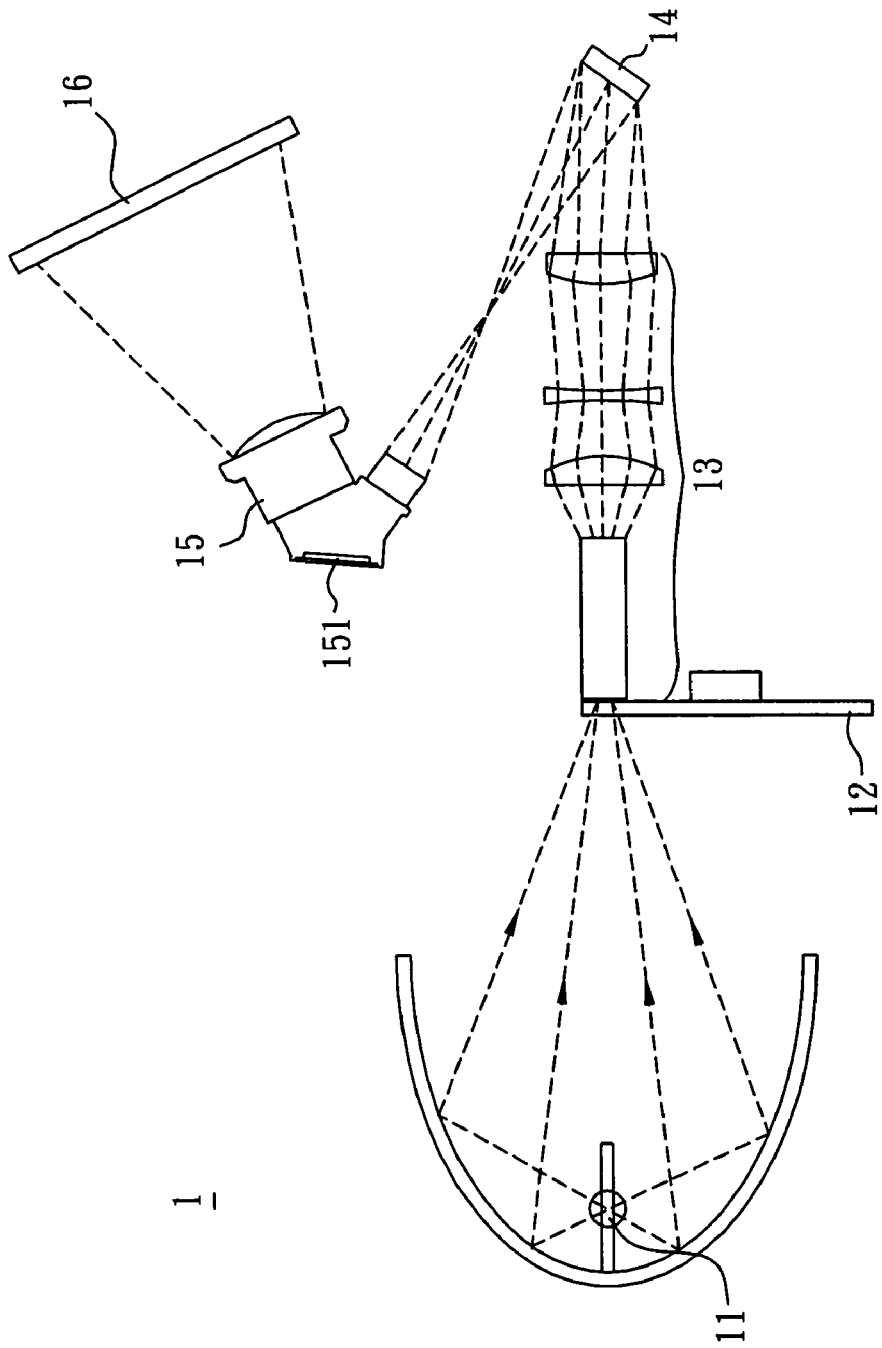
FIG. 1 is a schematic illustration showing a conventional projection system.
Figure 2:
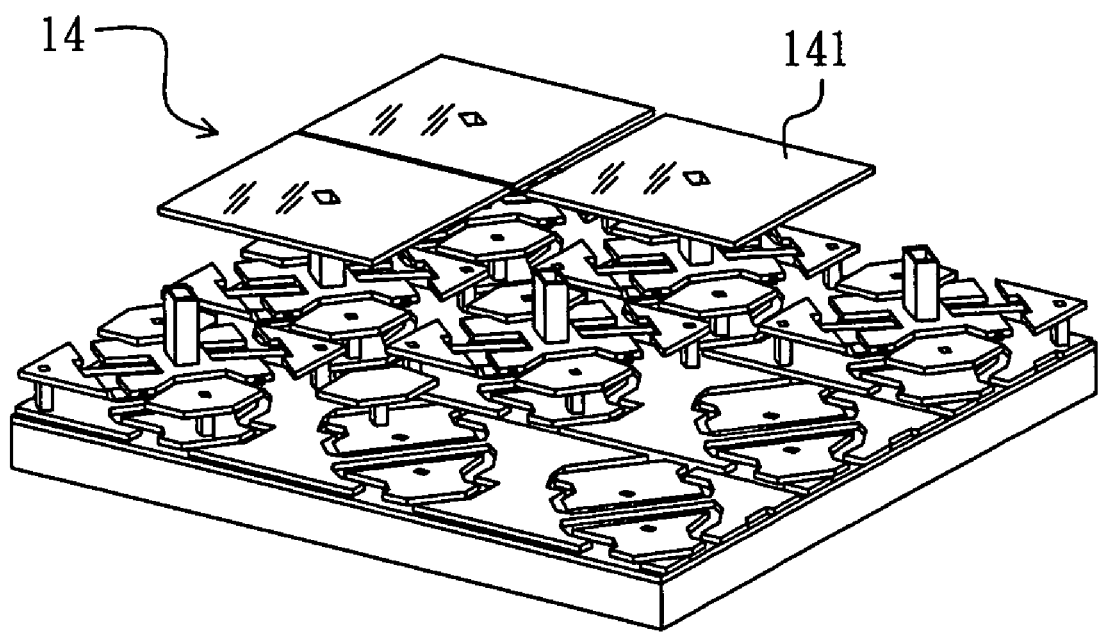
FIG. 2 is a schematic illustration showing a conventional DMD.
Figure 3:
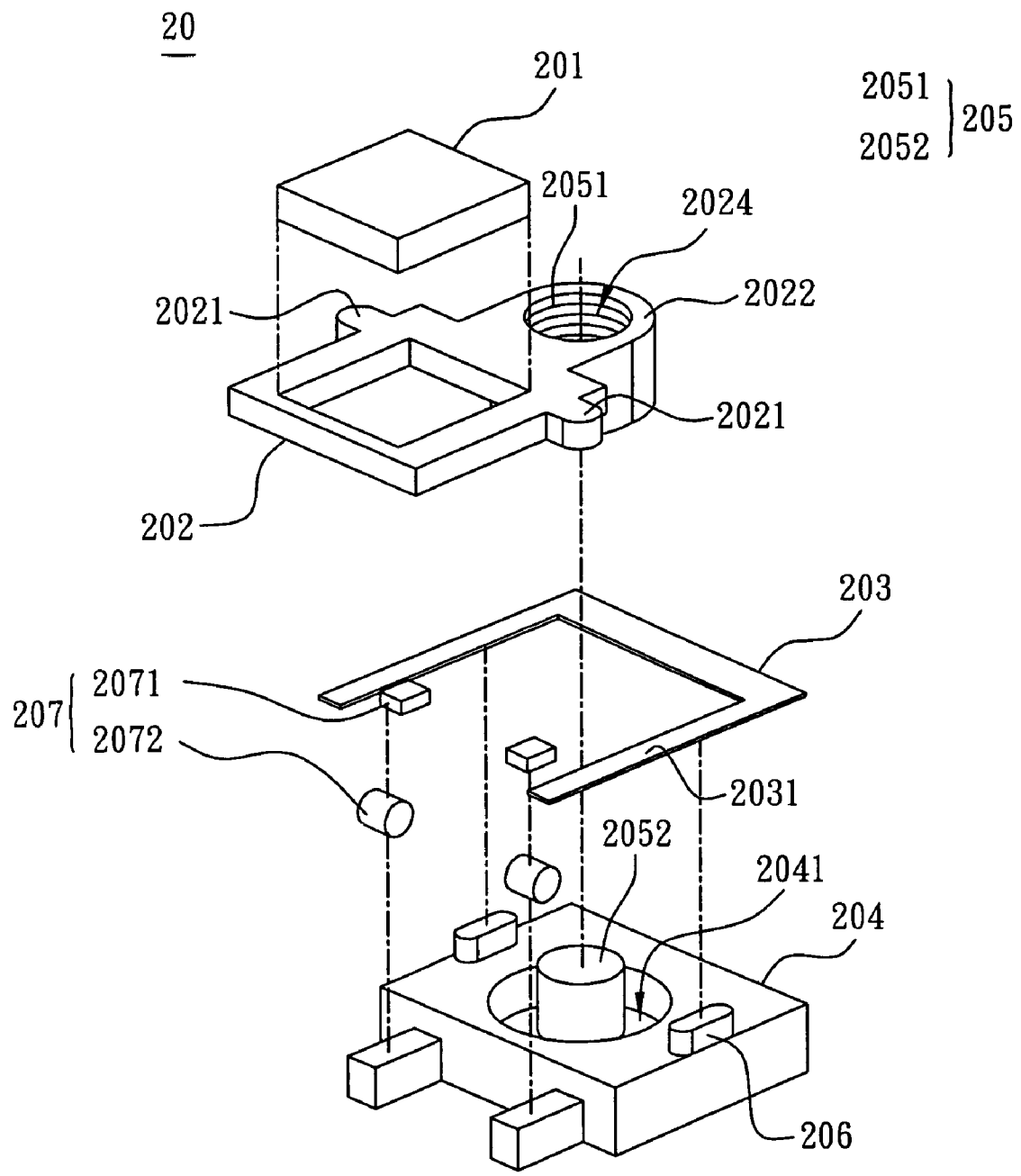
FIG. 3 is an exploded view showing a smooth picture device according to a preferred embodiment of the invention.

Referring to FIG. 3, a smooth picture device 20 according to a preferred embodiment of the invention includes an optical element 201, a holder 202, a flexible member 203, a base 204 and an actuator 205.

The holder 202 supports the optical element 201, which can be a reflector or transparent glass. For example, the smooth picture device 20 can be applied to a transmissive smooth picture element, in which the optical element 201 is made of transparent glass.

Figure 4:
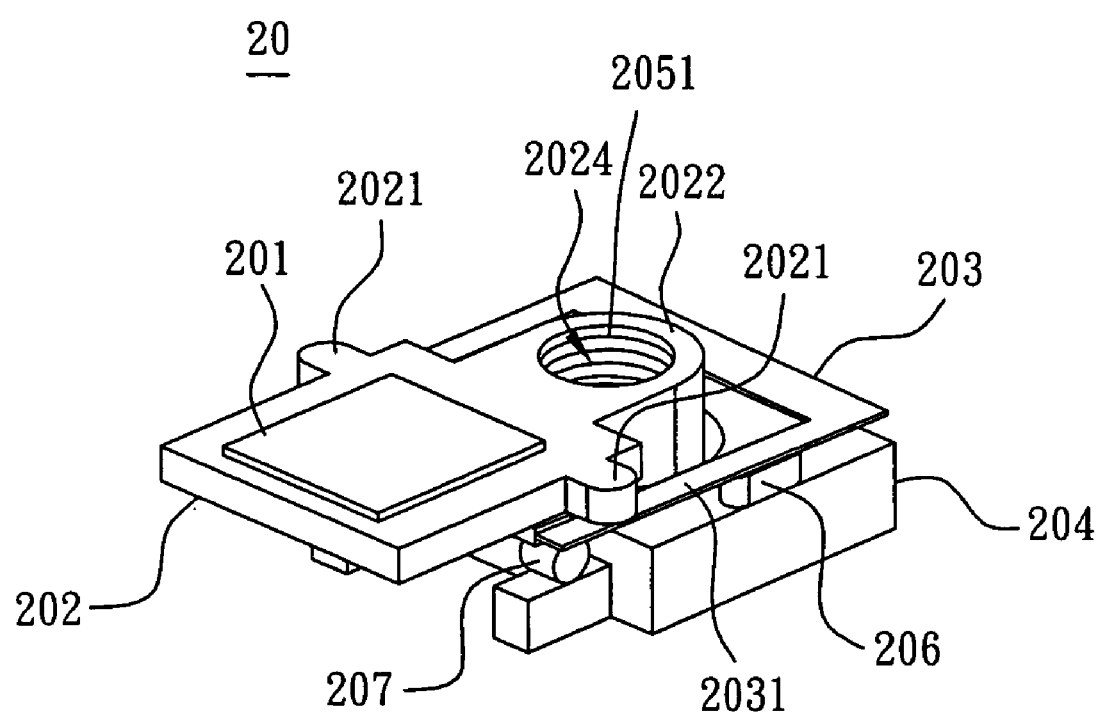
FIG. 4 is an assembled view showing the smooth picture device according to the preferred embodiment of the invention.

As shown in FIG. 4, at least one portion of the holder 202 is coupled to the flexible member 203, and the other portion of the holder 202 is suspended out of the edge of the flexible member 203. In this embodiment, the flexible member 203 is a flexible sheet and has two cantilevers 2031 disposed in parallel to each other. Each of the opposite sides of the holder 202 is extended to form a connecting part 2021. The connecting parts 2021 of the holder 202 are connected to the cantilevers 2031. Herein, the other portion of the holder 202 is suspended out from the cantilevers 2031.

The base 204 supports the flexible member 203, as shown in FIGS. 3 and 4. The base 204 is formed with at least one first supporting element 206 on a surface of the base 204 to support the flexible member 203.

The actuator 205 includes at least one coil 2051 and at least one first magnetic element 2052. In this embodiment, the holder 202 is extended to form an actuating arm 2022 having a through hole 2024, in which the coil 2051 is disposed. The first magnetic element 2052 corresponding to the coil 2051 is accommodated in a space 2041 of the base 204 and is fixed to the base 204. The through hole 2024 accommodates the first magnetic element 2052 so that the holder 202 is actuated according to the cooperation between the coil 2051 and the first magnetic element 2052.

In this embodiment, the first magnetic element 2052 may be a permanent magnet. A current flows through the coil 2051 to generate a magnetic field, which interacts with the magnetic field of the first magnetic element 2052. That is, the coil 2051 can actuate the holder 202 by changing or switching the current direction and discharging the current, and the actuating intensity can be changed by changing the magnitude of the current.

Figure 5:
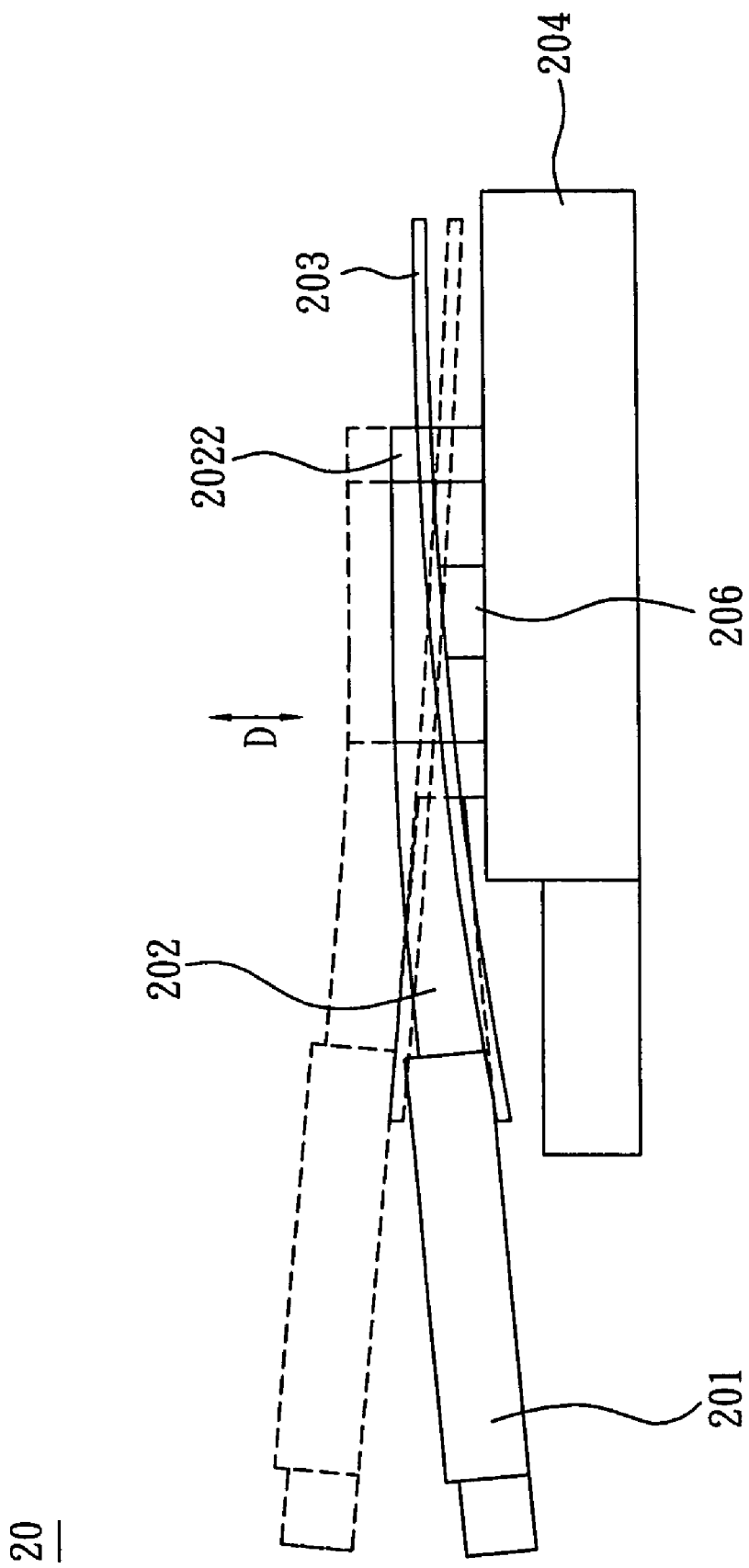
FIGS. 5 and 6 are schematic illustrations showing various operations of the smooth picture device according to the preferred embodiment of the invention.

The embodied smooth picture device 20 is shown in FIG. 5. When the current flows through the coil 2051 to generate a magnetic field, the magnetic field cooperates with the first magnetic element 2052, and the magnetizing and neutralizing states are switched according to the frequency of the states so that the actuating arm 2022 of the holder 202 moves vertically in a direction D. When the actuating arm 2022 of the holder 202 moves downward, the connecting parts 2021 press the cantilevers 2031 of the flexible member 203. Thus, the flexible member 203 deforms, and a free end of the holder 202, which is suspended out of the flexible member 203, vibrates back and forth with a frequency according to a restoring force of the flexible member 203.

Figure 6:
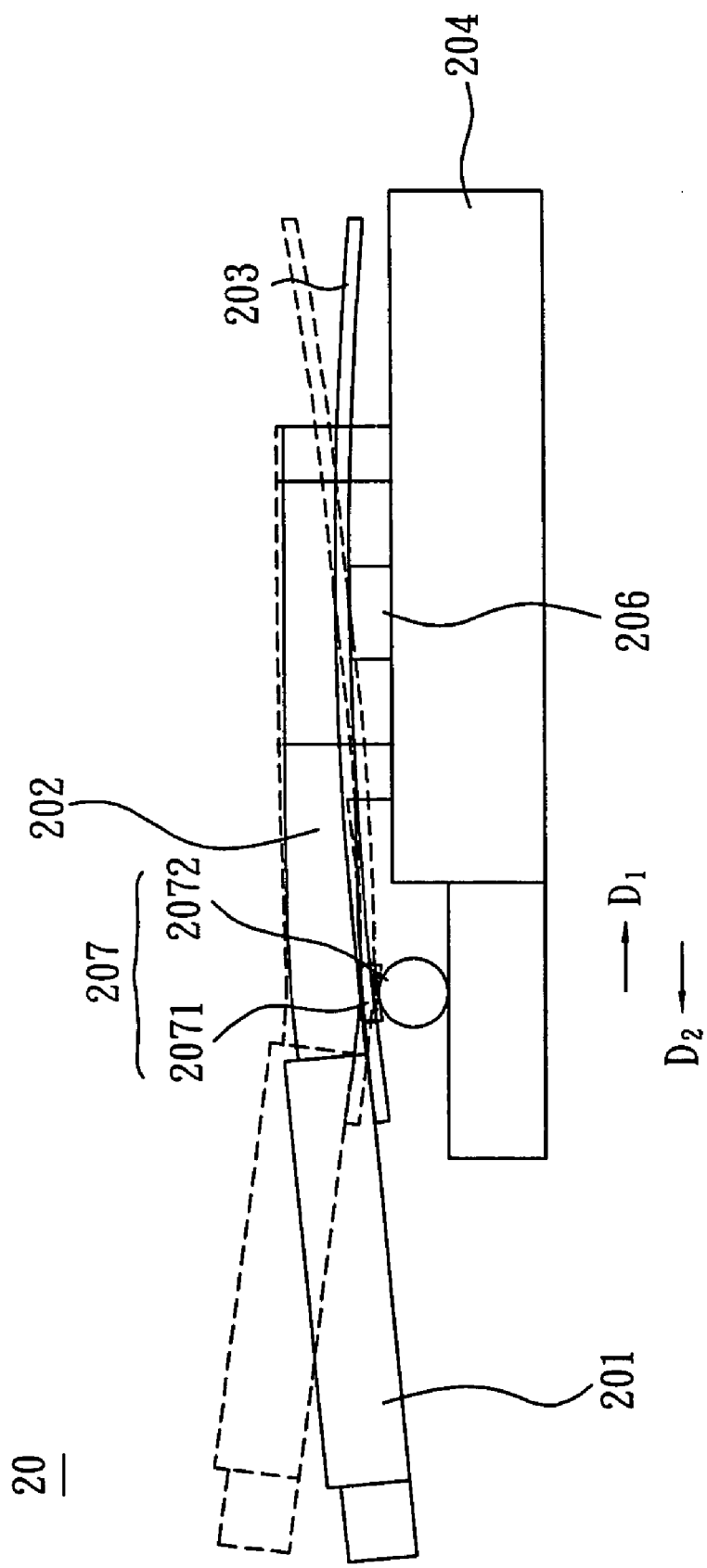

As shown in FIGS. 3 and 6, the smooth picture device 20 further includes at least one fulcrum assembly 207 disposed between the holder 202 and the base 204. The fulcrum assembly 207 includes a second magnetic element 2071 disposed on the holder 202, and a soft magnetic element 2072 which corresponds to the second magnetic element 2071 and is disposed on the base 204. In this embodiment, the second magnetic element 2071 is a permanent magnet, and the soft magnetic element 2072 is made of a metal material and has a spherical shape or a cylindrical shape as example. The second magnetic element 2071 and the soft magnetic element 2072 generate an attractive reaction force.

When the actuating arm 2022 of the holder 202 is actuated by the actuator 205 to press the cantilevers 2031 by the connection portion between the holder 202 and the flexible member 203, the holder 202 vibrates about the fulcrum assembly 207 serving as the fulcrum due to the attractive reaction force between the soft magnetic element 2072 and the second magnetic element 2071. Thus, the free end of the holder 202 swings with amplitude, and the fulcrum assembly 207 restricts the holder 202 to swing about a fulcrum. Consequently, adjusting the position of the fulcrum assembly 207 can change the vibrating amplitude of the holder 202 and correct the assembling tolerance of the smooth picture device 20. For example, when the fulcrum assembly 207 is disposed at a position biasing toward a first direction D1, the holder 202 has larger vibrating amplitude. On the contrary, when the fulcrum assembly 207 is disposed at another position biasing toward a second direction D2, the holder 202 has smaller vibrating amplitude.

Figure 7:
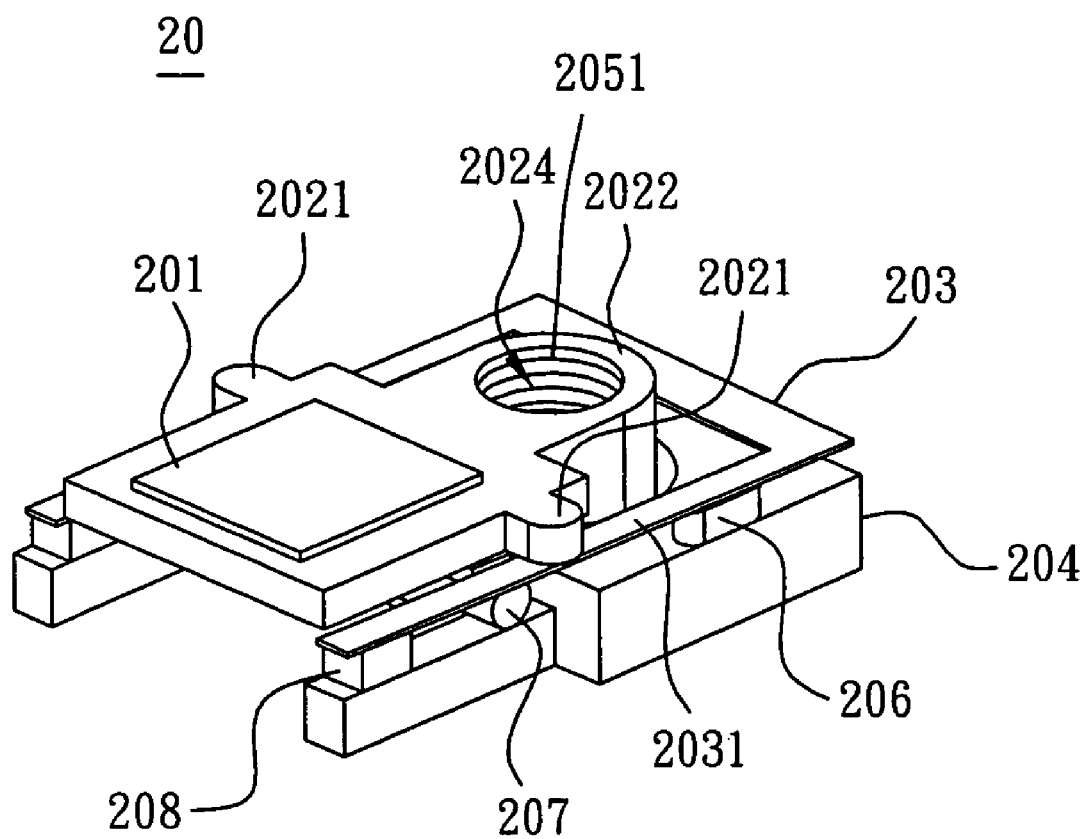
FIG. 7 is an assembled view showing a smooth picture device according to another preferred embodiment of the invention.
Figure 8:
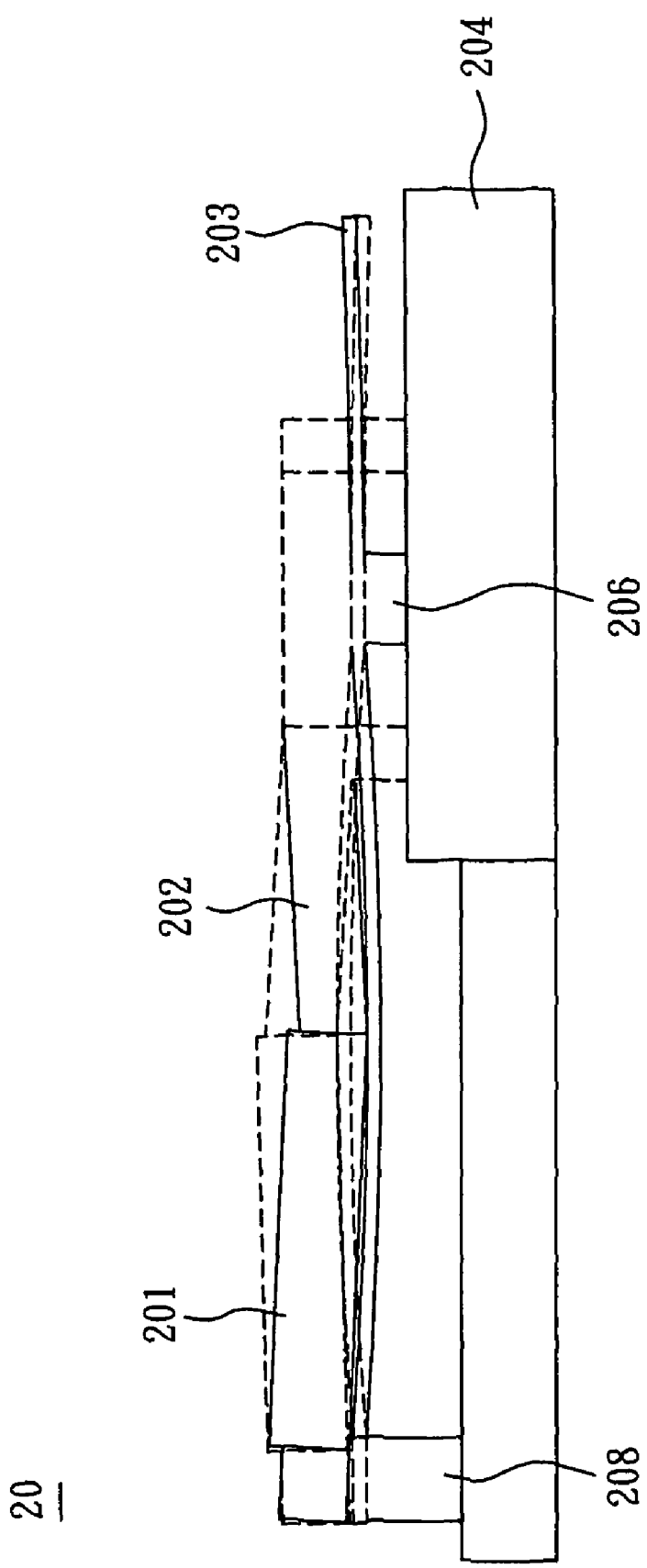
FIGS. 8 and 9 are schematic illustrations showing various operations of the smooth picture device according to the another preferred embodiment of the invention.
Figure 9:
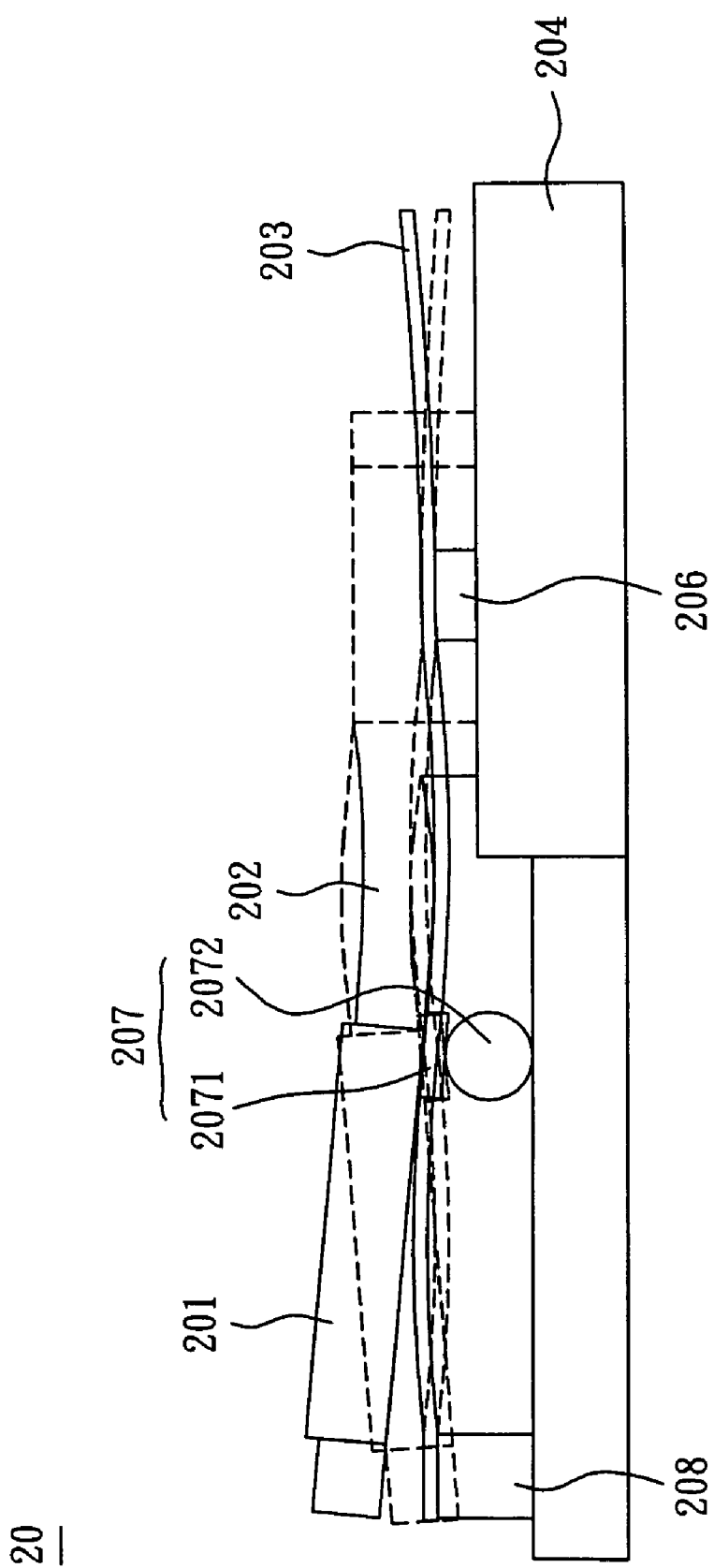

As shown in FIGS. 7 and 8, the base 204 of the smooth picture device 20 according to another embodiment of the invention includes the first supporting element 206 and at least one second supporting element 208 for supporting the flexible member 203. The first supporting element 206 and the second supporting element 208 are disposed at opposite sides of the connecting part 2021. When the connecting parts 2021 press the cantilevers 2031 of the flexible member 203, the deformations and the restoring forces of the cantilevers 2031 enable the holder 202 to vibrate with a frequency. In addition, as shown in FIGS. 7 and 9, the smooth picture device 20 further includes the fulcrum assembly 207 disposed between the holder 202 and the base 204, and the fulcrum assembly 207 can be disposed between the first supporting element 206 and the second supporting element 208 to adjust the vibrating amplitude of the holder 202 and the assembling tolerance of the smooth picture device 20.

Figure 10:
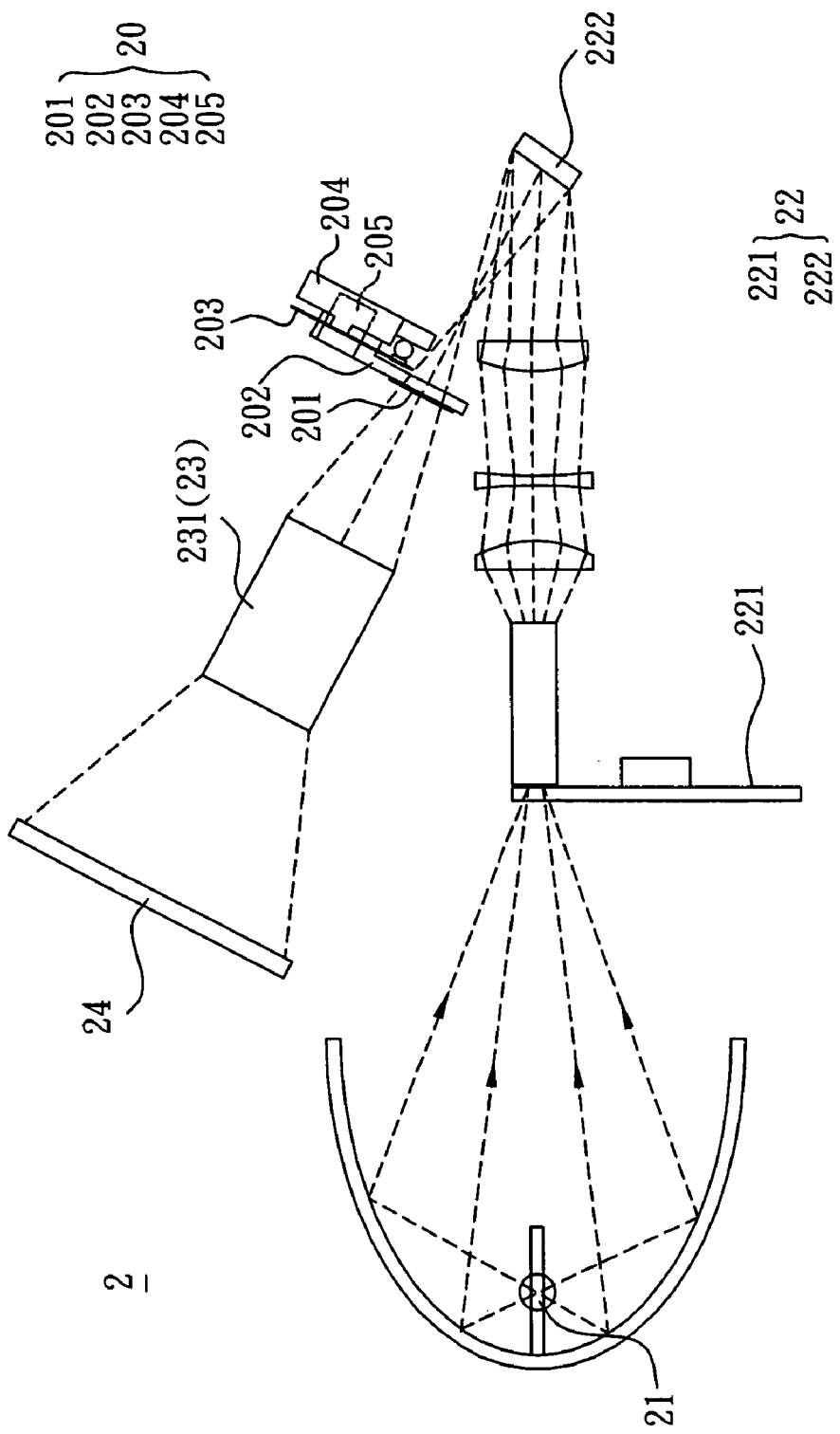
FIG. 10 is a schematic illustration showing an optical projection system according to a preferred embodiment of the invention.

As shown in FIGS. 3 and 10, an optical projection system 2 according to the preferred embodiment of the invention includes a light source 21, an optical modulating assembly 22, a projection lens set 23 and a smooth picture device 20.

The light source 21 emits a light. The optical modulating assembly 22 modulates the light emitted from the light source 21 and includes a filter 221 and a DMD 222. The filter 221 filters the light emitted from the light source 21, and the DMD 222 receives the light passing through the filter 221 and controls and modulates the light path of the light and modulates the light into a modulated light.

The projection lens set 23 includes a lens barrel 231 and at least one lens accommodated in the lens barrel 231. The projection lens set 23 receives and amplifies the modulated light and projects the amplified light onto a display screen 24 to form a picture.

The smooth picture device 20 is disposed on the light path of the light to achieve the object of smoothing the picture. The smooth picture device 20 can be abutted on or coupled to the lens barrel 231 as shown in FIG. 10. The smooth picture device 20 includes an optical element 201, a holder 202, a flexible member 203, a base 204 and an actuator 205. The actuator 205 cooperates with the flexible member 203 to vibrate the holder 202 with a frequency so as to break the regular light path and thus make the picture continuous. The lens barrel 231 may be a straight-type lens barrel as shown in FIG. 10, and the optical element 201 is transparent glass. Alternately, the lens barrel 231 may be a turning-type lens barrel (not shown), and the optical element 201 may be a reflector.

Because the structural features, operation and function of the smooth picture device 20 are the same as those stated hereinabove, detailed descriptions thereof will be omitted.

In summary, the optical projection system and the smooth picture device thereof according to the invention are to vibrate the holder using the actuator, and the holder applies a force to a connection between the supporting elements and the flexible member in a direction such that the flexible member deforms and vibrates due to the restoring force of the flexible member. Thus, the holder suspended out of the flexible member generates a natural vibrating frequency with the vibration of the flexible member. The vibration of the optical element together with the holder can break the regular light path to achieve the object of smoothing the picture effectively.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A smooth picture device comprising:
   an optical element;
   a holder for supporting the optical element;
   a flexible member, wherein the holder has at least one portion coupled to the flexible member and an another portion suspended out of the flexible member;
   a base for supporting the flexible member; and
   an actuator coupled to the holder for actuating the holder to vibrate.

2. The smooth picture device according to claim 1, wherein the flexible member has two cantilevers and each of opposite sides of the holder is extended to form a connecting part to be connected to the cantilevers.

3. The smooth picture device according to claim 1, wherein the base comprises at least one first supporting element for supporting the flexible member.

4. The smooth picture device according to claim 3, wherein the base is formed with at least one second supporting element for supporting the flexible member, and the first supporting element and the second supporting element are respectively disposed on opposite sides of a connecting part.

5. The smooth picture device according to claim 1, wherein the holder comprises an actuating arm coupled to the actuator.

6. The smooth picture device according to claim 5, wherein the actuator comprises at least one coil and at least one first magnetic element, the first magnetic element is disposed on the base, and the coil corresponds to the first magnetic element and is wound in a through hole of the actuating arm.

7. The smooth picture device according to claim 6, wherein the first magnetic element or the second magnetic element is a permanent magnet.

8. The smooth picture device according to claim 1, further comprising at least one fulcrum assembly disposed between the holder and the base.

9. The smooth picture device according to claim 8, wherein the fulcrum assembly comprises a second magnetic element and a soft magnetic element, the second magnetic element is disposed on the holder and the soft magnetic element corresponds to the second magnetic element and is disposed on the base.

10. The smooth picture device according to claim 9, wherein the soft magnetic element is made of a metal material.

11. The smooth picture device according to claim 1, wherein the optical element is transparent glass or a reflector.

12. The smooth picture device according to claim 1, being applied to a transmissive smooth picture element.

13. An optical projection system comprising:
    a light source for generating a light;
    an optical modulating assembly for modulating the light into a modulated light;
    a projection lens set for receiving the modulated light and projecting the modulated light onto a display screen to form a picture; and
    a smooth picture device disposed in a light path of the light, wherein the smooth picture device comprises an optical element, a holder, an flexible member, a base and an actuator, the holder supports the optical element, at least one portion of the holder is coupled to the flexible member, an another portion of the holder is suspended out of the flexible member, the base supports the flexible member, and the actuator is coupled to the holder and actuates the holder to vibrate.

14. The optical projection system according to claim 13, wherein the flexible member has two cantilevers, and each of opposite sides of the holder comprises a connecting part to be connected to the cantilevers.

15. The optical projection system according to claim 14, wherein the base comprises at least one first supporting element for supporting the flexible member, at least one second supporting element for supporting the flexible member, and the first supporting element and the second supporting element are respectively disposed on opposite sides of the connecting part.

16. The optical projection system according to claim 13, wherein the holder comprises an actuating arm coupled to the actuator the actuator comprises at least one coil and at least one first magnetic element, the first magnetic element is disposed on the base, and the coil corresponds to the first magnetic element and is wound in a through hole of the actuating arm.

17. The optical projection system according to claim 13, further comprising at least one fulcrum assembly disposed between the holder and the base the fulcrum assembly comprises a second magnetic element and a soft magnetic element, the second magnetic element is disposed on the holder and the soft magnetic element corresponds to the second magnetic element and is disposed on the base.

18. The optical projection system according to claim 13, wherein the optical element is transparent glass or a reflector.

19. The optical projection system according to claim 13, wherein the projection lens set comprises a straight-type lens barrel or turning-type lens barrel, and the smooth picture device abuts on or connects with the lens barrel.

20. The optical projection system according to claim 19, wherein the projection lens set further comprises at least one lens accommodated in the lens barrel for receiving the modulated light and amplifying and projecting the modulated light onto the display screen to form the picture.

21. The optical projection system according to claim 13, wherein the optical modulating assembly comprises a filter for filtering the light emitted from the light source, and a DMD (digital micro-mirror device) for receiving the light passing through the filter and modulating the light path of the light.

* * * * *